United States Patent
Hu et al.

(10) Patent No.: US 9,082,441 B1
(45) Date of Patent: Jul. 14, 2015

(54) HEAD SLIDER HAVING IMPROVED AIR BEARING COMPLIANCE AND HIGHER ACTUATION EFFICIENCY

(71) Applicant: HGST Netherlands B.V., Amsterdam (NL)

(72) Inventors: Yong Hu, San Ramon, CA (US); Weidong Huang, Palo Alto, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/294,075

(22) Filed: Jun. 2, 2014

(51) Int. Cl.
*G11B 5/60* (2006.01)

(52) U.S. Cl.
CPC .................................. *G11B 5/6082* (2013.01)

(58) Field of Classification Search
CPC .................................................. G11B 5/6082
USPC ........... 360/235.7, 236.2, 236.3, 236.5, 236.9
See application file for complete search history.

(56) References Cited

U.S. PATENT DOCUMENTS

| | | | |
|---|---|---|---|
| 4,870,519 | A | 9/1989 | White |
| 7,009,813 | B2 | 3/2006 | Kang et al. |
| 7,679,863 | B2 | 3/2010 | Hashimoto et al. |
| 8,184,405 | B1 | 5/2012 | Zheng et al. |
| 8,325,445 | B2 | 12/2012 | Takeuchi |
| 8,553,363 | B2 * | 10/2013 | Dorius ........................ 360/235.9 |
| 2008/0198509 | A1 * | 8/2008 | Bolasna et al. ............ 360/235.5 |
| 2010/0091405 | A1 * | 4/2010 | Huang ........................ 360/235.4 |
| 2010/0091406 | A1 * | 4/2010 | Huang et al. ............... 360/235.4 |
| 2010/0128395 | A1 * | 5/2010 | Dorius ........................ 360/235.5 |
| 2011/0122532 | A1 * | 5/2011 | Bolasna et al. ............ 360/236.5 |
| 2013/0258528 | A1 | 10/2013 | Krolnik, II et al. |

FOREIGN PATENT DOCUMENTS

EP 0576803 A1 1/1994

OTHER PUBLICATIONS

Gonzaga, L. V. et al.: "Slider Design Optimization for Lube-Surfing Head-Disk Interface Scheme"; IEEE Transactions on Magnetics; vol. 46, No. 6; Jun. 2010; 3 pages.
IBM Technical Disclosure Bulletin: "Slider Air-Bearing for Lower Fly Height, Improved Durability, and Reduced Repeatable Run-Out"; IP.com Prior Art Database Disclosure; IP.com Disclosure No. IPCOM000013591D; Publication Date Aug. 2001.

* cited by examiner

*Primary Examiner* — Wayne Young
*Assistant Examiner* — Carlos E Garcia
(74) *Attorney, Agent, or Firm* — Patterson & Sheridan, LLP (57) ABSTRACT

Embodiments disclosed herein generally relate to a head slider within disk drive data storage devices. A head slider comprises a head body having a leading edge, a trailing edge and an ABS. The ABS has a leading portion and a trailing portion, the trailing portion having a tail section disposed adjacent the trailing edge. The head body has three surfaces recessed from the ABS: a first surface disposed a first vertical distance, a second surface disposed a second vertical distance that is greater than the first vertical distance, and a third surface disposed a third vertical distance that is greater than the second vertical distance. A first plateau disposed at the third surface is bound between a second plateau at the first surface and a trailing pad of the tail section. Between the first plateau and the trailing pad are one or more notches disposed at the first surface.

20 Claims, 10 Drawing Sheets

HEAD SLIDER HAVING IMPROVED AIR BEARING COMPLIANCE AND HIGHER ACTUATION EFFICIENCY

BACKGROUND

1. Field

Embodiments disclosed herein generally relate to a head slider within disk drive data storage devices.

2. Description of the Related Art

In an electronic data storage and retrieval system, a magnetic head typically includes a read/write transducer for retrieving and storing magnetically encoded information on a magnetic recording medium or disk. A suspended head slider supports the magnetic head. In operation, the head slider rides on a cushion or bearing of air above the surface of the disk as the disk is rotating at its operating speed. The head slider includes media facing surface (MFS), such as an air bearing surface (ABS), designed to generate an air bearing force that counteracts a preload bias urging the head slider toward the disk. The head slider flies above and out of contact with the disk at a fly height as a result of the MFS.

Several problems with prior art head sliders are encountered that affect fly height negatively. Some of these include: lubricant pick-up; minimum fly height variations at high altitudes; pitch of the head slider; high peak pressure between the head slider and the disk, which increases lubricant pick-up and affects the ability to efficiently compensate for fly height variations; mid disk (MD) hump; and insufficient stiffness of the head slider. Lubricant pickup occurs when lubricant coated on the disk collects on the head slider. Once collected on the head slider, the lubricant tends to interfere with the fly-height and result in poor magnetic interfacing between the head slider and the disk. At high altitudes, such as 3000 meters or more above sea level or when in an airplane, the fly height may differ as compared to at sea level. The head slider may also undesirably pitch and crash on the hard disk. Further, the high peak pressure associated with air pressure between the head slider and the disk may contribute to lubricant pickup. As the peak pressure increases, the ability to compensate and efficiency of any compensation for fly-height of the magnetic head decreases and the actuation efficiency is lowered. MD hump problems are associated with the head slider flying higher at middle locations of the disk where the skew angle of the head slider is close to zero, as opposed to the fly heights at the inner diameter (ID) and outer diameter (OD) of the disk. If the head slider has insufficient stiffness, it may flex and distort during operation of the hard disk drive. Distortion of the head slider may affect the distance between the read/write head and the disk, which can result in poor magnetic interfacing between the two and a lower air bearing compliance. Severe distortion may lead to more catastrophic failures caused by contact between portions of the head slider and the disk.

Therefore, an improved head slider with improved air bearing compliance and higher actuation efficiency is needed.

SUMMARY

Embodiments disclosed herein generally relate to a head slider within disk drive data storage devices. A head slider comprises a head body having a leading edge, a trailing edge and a MFS. The MFS has a leading portion and a trailing portion, the trailing portion having a tail section disposed adjacent the trailing edge. The head body has three surfaces recessed from the MFS: a first surface disposed a first vertical distance, a second surface disposed a second vertical distance that is greater than the first vertical distance, and a third surface disposed a third vertical distance that is greater than the second vertical distance. A first plateau disposed at the third surface is bound between a second plateau at the first surface and a trailing pad of the tail section. Between the first plateau and the trailing pad are one or more notches disposed at the first surface.

In one embodiment, a head slider comprises a head body having a leading edge, a trailing edge and a MFS. The MFS has a leading portion and a trailing portion coupled to the leading portion by a flange portion. The trailing portion has a tail section disposed adjacent the trailing edge. The head body also has a first surface disposed a first vertical distance from the MFS, the first surface at least partially surrounded by the tail section, a second surface disposed a second vertical distance from the MFS that is greater than the first vertical distance, the second surface partially defining the boundaries of the tail section, and a third surface disposed a third vertical distance from the MFS that is greater than the second vertical distance. The tail section includes a first plateau disposed at the third surface, and the first plateau is at least partially surrounded by the air bearing surface. The tail section further includes a second plateau disposed at the first surface and disposed closer to the leading portion than the first plateau, the second plateau bordering the first plateau. The tail section also includes at least one notch disposed at the first surface, where the one or more notches are disposed closer to the trailing edge than the first plateau, and where the one or more notches border the first plateau and the MFS.

In another embodiment, a magnetic recording system comprises an actuator, an actuator arm coupled to the actuator, a slider coupled to the actuator arm, and a head slider coupled to the slider. The head slider comprises a head body having a leading edge, a trailing edge and a MFS. The MFS has a leading portion and a trailing portion coupled to the leading portion by a flange portion. The trailing portion has a tail section disposed adjacent the trailing edge. The head body also has a first surface disposed a first vertical distance from the MFS, the first surface at least partially surrounded by the tail section, a second surface disposed a second vertical distance from the MFS that is greater than the first vertical distance, the second surface partially defining the boundaries of the tail section, and a third surface disposed a third vertical distance from the MFS that is greater than the second vertical distance. The tail section includes a first plateau disposed at the third surface, and the first plateau is at least partially surrounded by the MFS. The tail section further includes a second plateau disposed at the first surface and disposed closer to the leading portion than the first plateau, the second plateau bordering the first plateau. The tail section also includes at least one notch disposed at the first surface, where the one or more notches are disposed closer to the trailing edge than the first plateau, and where the one or more notches border the first plateau and the MFS.

In another embodiment, a hard disk drive comprises a spindle, one or more magnetic media disposed on the spindle, an actuator, an actuator arm coupled to the actuator, a slider coupled to the actuator arm, and a head slider coupled to the slider. The head slider comprises a head body having a leading edge, a trailing edge and a MFS. The MFS has a leading portion and a trailing portion coupled to the leading portion by a flange portion. The trailing portion has a tail section disposed adjacent the trailing edge. The head body also has a first surface disposed a first vertical distance from the MFS, the first surface at least partially surrounded by the tail section, a second surface disposed a second vertical distance from the MFS that is greater than the first vertical distance, the second surface partially defining the boundaries of the tail section, and a third surface disposed a third vertical distance from the MFS that is greater than the second vertical distance. The tail section includes a first plateau disposed at the third surface, and the first plateau is at least partially surrounded by the MFS. The tail section further includes a second plateau disposed at the first surface and disposed closer to the leading portion than the first plateau, the second plateau bordering the first plateau. The tail section also includes at least one notch disposed at the first surface, where the one or more notches are disposed closer to the trailing edge than the first plateau, and where the one or more notches border the first plateau and the MFS.

BRIEF DESCRIPTION OF THE DRAWINGS

So that the manner in which the above recited features discussed herein can be understood in detail, a more particular description of the above may be had by reference to embodiments, some of which are illustrated in the appended drawings. It is to be noted, however, that the appended drawings illustrate only typical embodiments and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the invention is not limited to specific described embodiments. Instead, any combination of the following features and elements, whether related to different embodiments or not, is contemplated to implement and practice the invention. Furthermore, although the embodiments may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to a head slider within disk drive data storage devices. A head slider comprises a head body having a leading edge, a trailing edge and a MFS. The MFS has a leading portion and a trailing portion, the trailing portion having a tail section disposed adjacent the trailing edge. The head body has three surfaces recessed from the MFS: a first surface disposed a first vertical distance, a second surface disposed a second vertical distance that is greater than the first vertical distance, and a third surface disposed a third vertical distance that is greater than the second vertical distance. A first plateau disposed at the third surface is bound between a second plateau at the first surface and a trailing pad of the tail section. Between the first plateau and the trailing pad are one or more notches disposed at the first surface.

Figure 1:
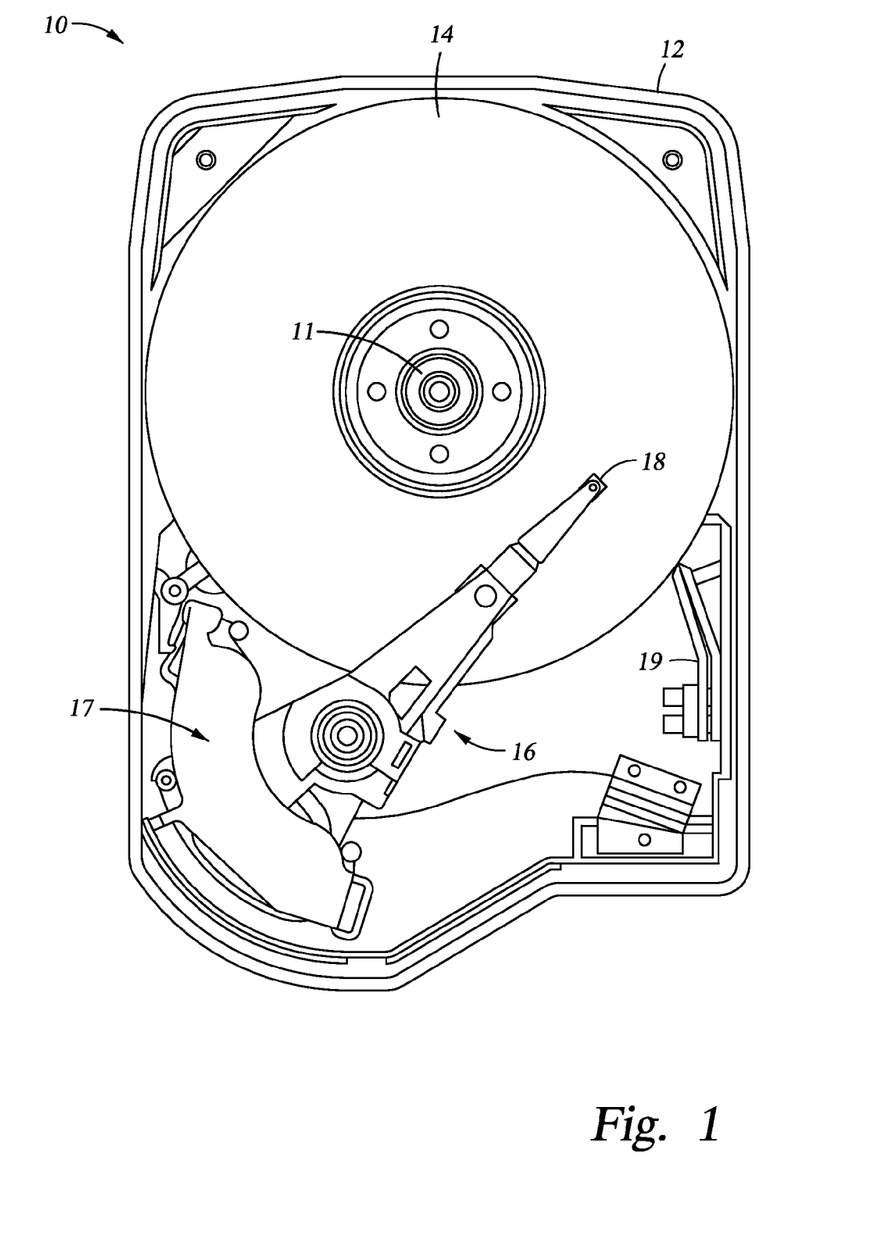
FIG. 1 shows an exemplary disk drive having a magnetic disk, and a head slider mounted on an actuator, according to one embodiment.

FIG. 1 shows one embodiment of a magnetic hard disk drive 10 that includes a housing 12 within which a magnetic disk 14 is fixed to a spindle 11 and a spindle motor (SPM) by a clamp. The SPM drives the magnetic disk 14 to spin at a certain speed. A head slider 18 accesses a recording area of the magnetic disk 14. The head slider 18 has a head element section and a slider to which the head element section is fixed. The head slider 18 is provided with a fly-height control which adjusts the flying height of the head above the magnetic disk 14. An actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's ABS facing the magnetic disk 14, a pressure acts on the head slider 18. The head slider 18 flies low above the magnetic disk 14 as a result of this pressure balancing between the air and the force applied by the actuator 16 toward the magnetic disk 14. In some embodiments, the head slider 18 may have raised areas or portions (such as pads) that actually contact disk 14, as opposed to the slider head "flying" over the disk 14. In some embodiments, the disk drive 10 may include a ramp 19, where the head slider 18 is parked when the disk drive 10 is not in operation and disk 14 is not rotating. The magnetic hard disk drive 10 illustrated in FIG. 1 may be any magnetic recording system, and is not limited to being a hard disk drive. Further, the ABS may be a media facing surface (MFS).

Figure 2:
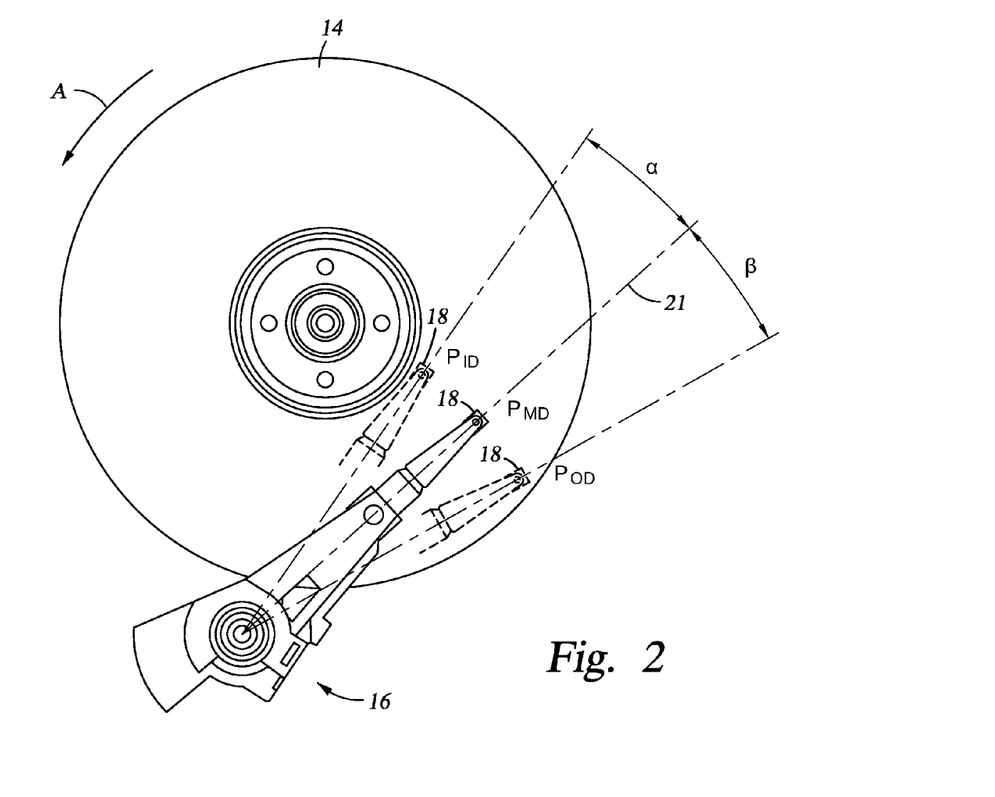
FIG. 2 is a diagram showing skew angles of the head slider at different positions with respect to the magnetic disk.

FIG. 2 is a diagram showing skew angles of the head slider 18 at different positions with respect to the magnetic disk 14. Actuator arm 16 supports the head slider 18 above the surface of the magnetic disk 14 at locations including an ID position $P_{ID}$, an OD position $P_{OD}$ and positions between $P_{ID}$ and $P_{OD}$. As the disk 14 spins, it produces airflow in a direction tangential to the disk in the direction the disk spins, as shown by arrow A. When the head slider 18 is at the mid-disk position $P_{MD}$, the centerline 21 of the head slider 18 is approximately aligned with the direction of the airflow produced by the disk 14, and the skew angle is therefore 0 (zero). When the head slider 18 is at other positions over the disk, however, the centerline 21 of the head slider 18 is not aligned with the direction of the airflow produced by the disk 14, and the angle of misalignment is known as the skew angle. As shown in FIG. 2, when the head slider is at the ID position $P_{ID}$, the skew angle is α, which is the maximum skew angle in the ID direction, and when the head slider is at the OD position $P_{OD}$, the skew angle is β, which is the maximum skew angle in the OD direction. The skew angle affects the aerodynamic characteristics of the head slider ABS. Generally, the greater the skew angle, the lower the lift produced for a given airflow velocity. In addition, the airflow velocity produced by the spinning disk 14 is dependent on the distance from the center of the disk. At head slider fly heights, the tangential airflow produced by the disk is very close to the tangential velocity of the disk. This tangential velocity is equal to (RPM)×2πR, where RPM is the rotations per minute of the disk, and R is the distance from the head slider location to the center of the disk. In general these effects combine to produce a fly height profile wherein the head slider tends to fly higher at the mid-disk position $P_{MD}$ and decreases in both directions to minimum values at the ID position $P_{ID}$ and the OD position $P_{OD}$. This phenomenon is known as mid disk (MD) hump as described above.

Figure 3:
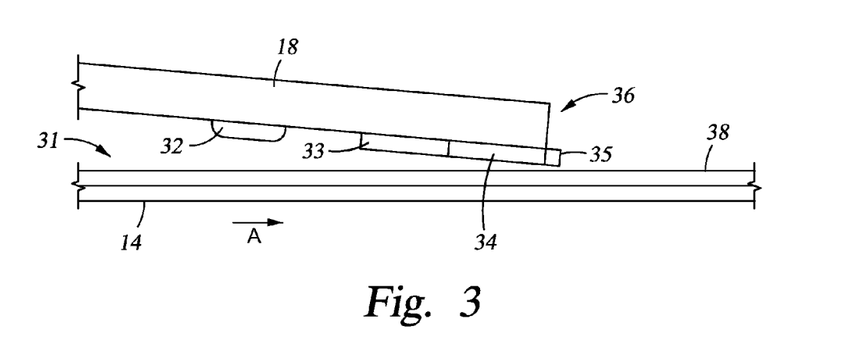
FIG. 3 is a side view of the head slider and magnetic disk of the disk drive of FIG. 1, according to one embodiment.

FIG. 3 is a side view of the head slider 18 and the magnetic disk 14 of FIG. 1. Magnetic disk 14 is moving in the direction of arrow A, (as also shown in FIG. 2), and causes airflow in the same direction. This airflow flows over the ABS 31 of the head slider 18 and produces the lifting pressure described above. In one embodiment, head slider 18 includes raised areas such as front pad 32, side pads 33 and trailing pad 34. Trailing pad 34, located adjacent to and centered relative to, the trailing edge 36 of the head slider 18, may further include the read/write head 35 that writes and reads data to and from magnetic disk 14. Disk 14 has a lubricant 38 on its upper surface to protect the disk 14 from contact with the head slider 18 and/or other components of the disk drive.

Figure 4:
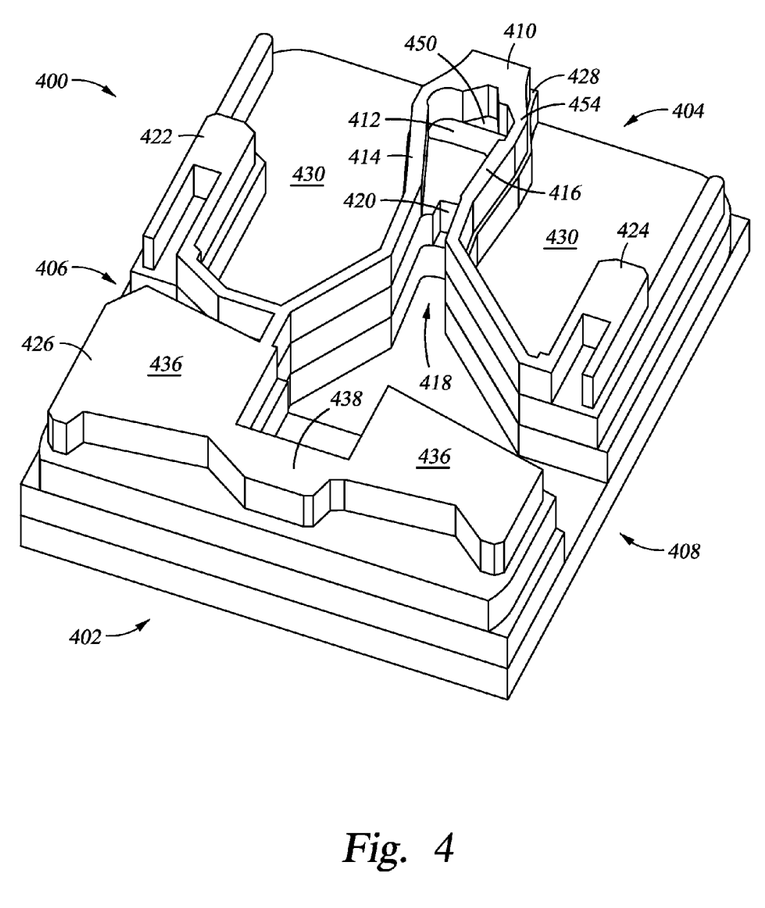
FIG. 4 is an isometric view of the bottom of a first embodiment of a slider head body used to make one embodiment of the head slider.

FIG. 4 is an isometric view of the bottom of a first embodiment of a head slider 400 according to one embodiment. The head slider 400 includes a leading edge 402, a trailing edge 404, first 406 and second 408 side edges and an ABS (the bottom surface of head slider 400 as shown oriented upwards in FIG. 5). In one embodiment, head slider 400 is the head slider 18 of FIGS. 1-3, and the ABS of head slider 400 is the ABS 31 of head slider 18 which faces magnetic disk 14 in FIG. 3. A trailing pad 410 is adjacent to the trailing edge 404 of the head slider 400, and substantially centered relative to the trailing edge 404. First 422 and second 424 side pads are adjacent to the first 406 and second 408 side edges of the head slider 400, respectively. In some embodiments, as shown, side pads 422 and 424 have a substantially "U" shaped configuration, with the open part of the U facing the leading edge 402 of the head slider 400. According to some embodiments, trailing pad 410 has a read/write head 428 mounted thereon, on the rear portion of the trailing pad adjacent to the trailing edge 404 of the head slider 400. In some embodiments, the ABS also has a leading pad 426 adjacent to the leading edge 402 of the head slider 400. The leading pad 426 includes two relatively wide side portions 436 that are connected by a relatively narrow bridge portion 438. The bridge portion 438 is closer to the leading edge 402 of the head slider than the side portions 436. First 414 and second 416 arms are connected to the sides of the trailing pad 410 and extend towards the leading edge 402 of the head slider 400. The trailing pad 410, the first arm 414 and the second arm 416 together form a tail section 454 of the trailing portion of the head slider. Between the first 414 and second 416 arms is a longitudinal channel 418. In some embodiments, the first 414 and second 416 arms connect the first 422 and second 424 side pads, respectively, to the trailing pad 410. The portion of the arms 414 and 416 closest to the trailing pad 410, extend towards the leading edge of the head slider as described above. As the arms 414 and 416 extend further from the trailing pad 410, the arms 414, 416 form an arc toward the side edges 406 and 408 of the head slider and connect to the inner top portion of the U-shaped side pads 422 and 424, respectively. As is shown in FIG. 4, a plateau 420 is located between the first 414 and second 416 arms, substantially centered in the longitudinal channel 418. A reactive ion etch (RIE) plateau 412, or recess, is formed between the first 414 and second 416 arms and between the plateau 420 and the trailing pad 410. At least one small notch 450, or pocket, created by shallow ion mill (SIM) is between the RIE plateau 412 and the trailing pad 410. The notch 450 boosts local pressure development at the trailing edge. The RIE plateau 412 has a bottom surface 432 that is between 10 nm and 10 μm below the top surface of the pads 410, 422, 424 and 426. Surface 430 is disposed at the same level as the plateau 420. In addition to the above described features, the ABS of head slider 400 may have other features both above and below surface 430, as described below with reference to the various embodiments of the invention.

Figure 5A:
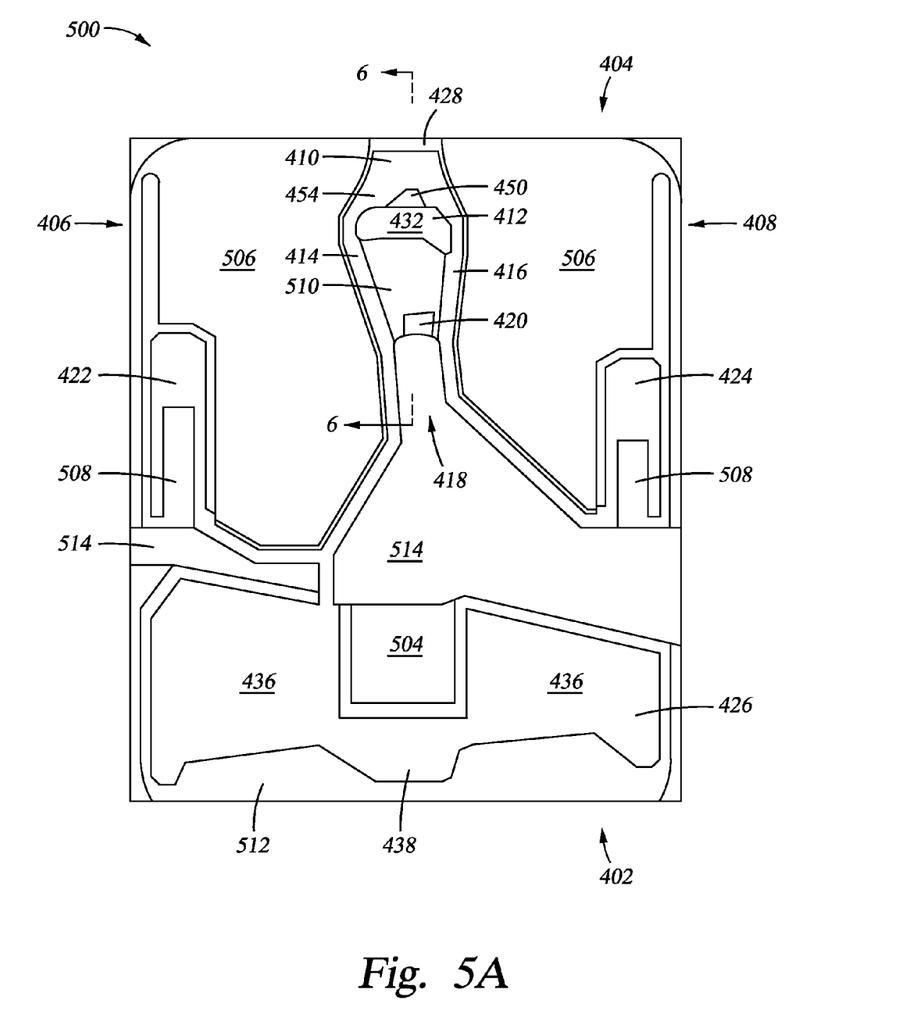
FIG. 5A is an isometric view of the bottom of one embodiment of a slider head body.

In FIG. 5A, a first embodiment of an ABS of head slider 500 is shown. Common features of FIG. 4 are labeled with the same reference designators in FIG. 5A. As is described more fully below, the head slider 500 includes features at various etch depths. The pads 420, 422, 424, 426 (which includes 436 and 438 in FIG. 5A) and the tail section 454 have a top surface that is at the highest level of the ABS (not etched). A first plateau 510 disposed directly behind the RIE plateau 412 and extends to region 514, the notch 450, the read/write head 428, region 512, which is in front of the leading pad portions 436 and 438 and may be referred to as a leading edge, are at a first etch depth of about 5 nm to 500 nm below the highest level of the ABS. A second plateau 504 disposed between the leading pad 426 and the longitudinal channel 418, a third plateau 420 and regions 506, which extend between the arms 414 and 416 and the trailing edge 404 and partially define the boundary of the tail section 454, are at a second etch depth about 10 nm to 5.0 μm below the highest level of the ABS. The head slider 500 may also include pockets 508 in front of and in the "U" of the side pads 422 and 424, in some embodiments. The portion 514 of longitudinal channel 418, which is between the first plateau 510 and the second plateau 504, and the pockets 502, 508 (when provided) are at a third etch depth about 10 nm to 10 μm below the highest level of the ABS. In one embodiment, ABS 500 is an MFS.

Focusing on the tail section 454 of the trailing portion of the head slider, the notch 450 at the first etch depth disposed between the RIE plateau 412 and the trailing pad 410 boosts local pressure development at the trailing edge 404, which is crucial for the airflow to flow as desired and to create an even lifting power over the entire head slider surface. The notch 450 also allows the head slider 400 to more accurately follow the contours of a magnetic media or disk, resulting in improved air bearing compliance and higher actuation efficiency. The notch 450 and the RIE plateau 412 can vary in both size and shape, as further discussed below, and are not limited to any particular size or shape unless otherwise explicitly noted. There may also be multiple notches 450 placed at this location, as shown in the head slider 530 of FIG. 5B.

Figure 6:
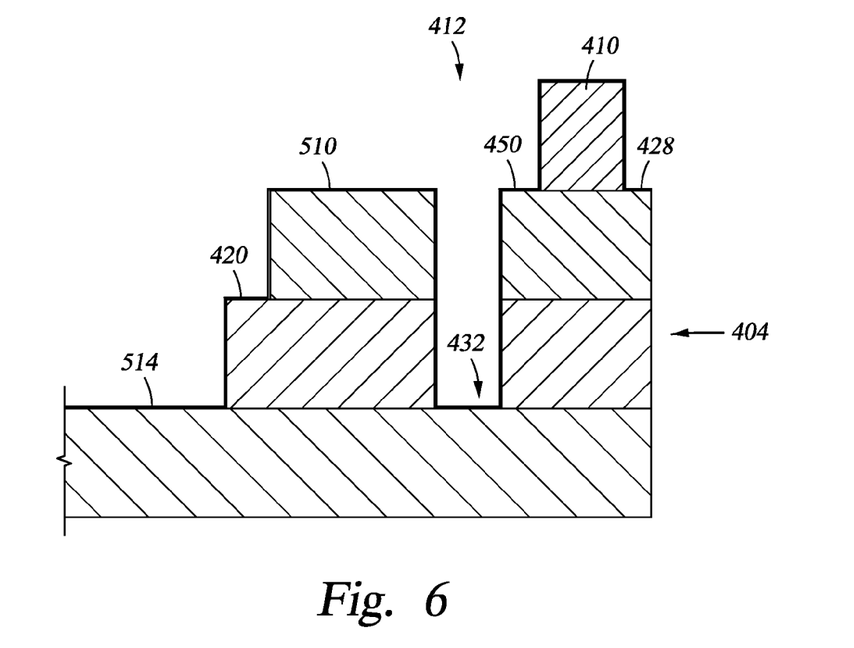
FIG. 6 is a cross section view taken through section line 6-6 of FIG. 5A.

Turning to FIG. 6, a cross section taken through section line 6-6 of FIG. 5A is shown. On the left side of FIG. 6, region 514 is shown at the third etch depth, the deepest of the etch depths. The third plateau 420 is shown to extend above region 514 at the second etch depth. The first plateau 510 is shown disposed adjacent the third plateau 420 at the first etch depth. The RIE plateau 412 is then shown with its bottom surface 432 at the third etch depth. The notch 450 is shown next to the RIE plateau 412 at the first etch depth. The trailing pad 410 of the tail section 454 is shown at the ABS level, or non-etched level. Lastly, the read/write head 428 is disposed at the trailing edge 404 and is at the first etch depth. It should be noted that, in some embodiments, while the side surfaces are shown as vertical, these side surfaces may be slanted, tapered or undulated, and need not be straight or vertical as shown. Further, it should also be noted that the corners may not be squared off as shown, in some embodiments.

Figure 5B:
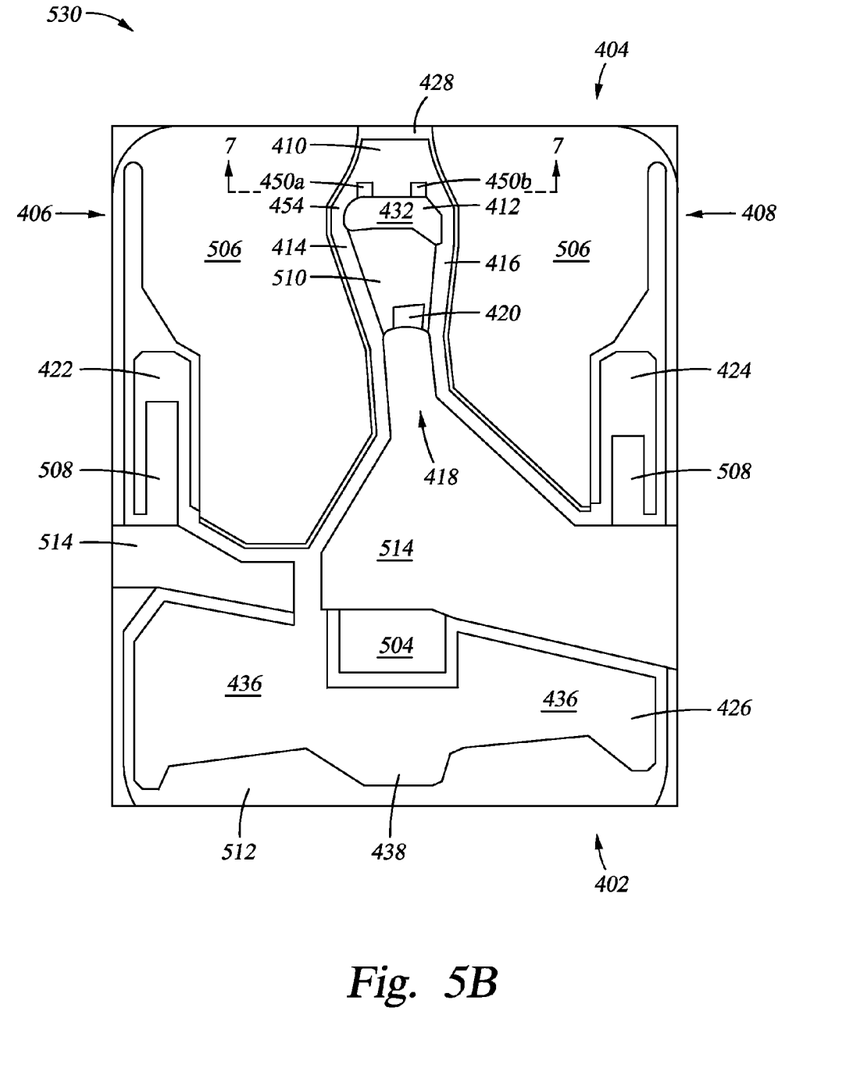
FIG. 5B is an isometric view of the bottom of another embodiment of a slider head body.

In FIG. 5B, another embodiment of an ABS of head slider 530 is shown. The head slider 530 may include some or all of the features shown with respect to head slider 500 in FIG. 5A. Those features have been omitted from FIG. 5B for clarity. Common features of FIG. 4 are labeled with the same reference designators in FIG. 5B. In the embodiment shown in FIG. 5B, there are two notches 450a and 450b at the first etch depth disposed between the trailing pad 410 and the RIE plateau 412, rather than only one notch 450 as shown in FIG. 5A. The two notches 450a and 450b may vary in shape from one another. The size of both notches 450a and 450b may be the same as one another, or one notch 450a may have a greater or smaller size than the other notch 450b. The two notches 450a and 450b are not in contact with one another, and the RIE plateau 412 and the trailing pad 410 are in contact in between the two notches 450a and 450b. Having two notches 450a, 450b between the RIE plateau 412 and the trailing pad 410 further boosts local pressure development at the trailing edge 404. The two notches 450a, 450b disposed on the head slider 530 also allow for the airflow to flow as desired and to create an even lifting power over the entire head slider surface, allowing the head slider 530 to more accurately follow the contours of a magnetic media or disk. This results in improved air bearing compliance and higher actuation efficiency.

Figure 7:
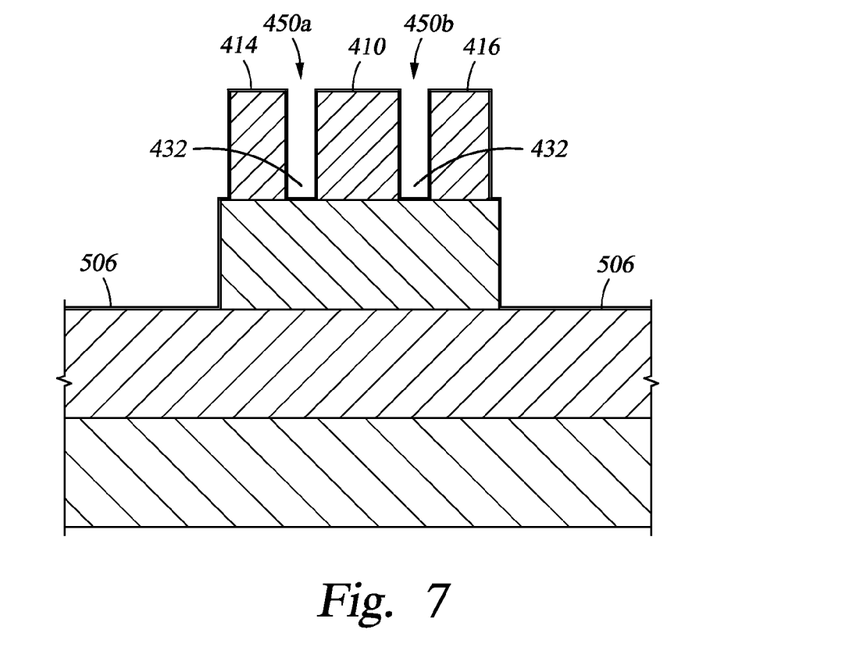
FIG. 7 is a cross section view taken through section line 7-7 of FIG. 5B.

FIG. 7 is a cross section taken through section line 7-7 of FIG. 5B. In FIG. 7, region 506 is shown at the second etch depth, while arms 414 and 416 are shown to extend above region 506 at the non-etch level of the ABS. The trailing pad 410 is also disposed at the non-etch level, illustrating that the tail section 454 is at the ABS level. Two notches 450a and 450b are shown at the first etch depth, with one notch 450a being disposed between arm 414 and the trailing pad 410 and the other notch 450b being disposed between the trailing pad 410 and arm 416. It should be noted that, in some embodiments, while the side surfaces are shown as vertical, these side surfaces may be slanted, tapered or undulated, and need not be straight or vertical as shown. Further, it should also be noted that the corners may not be squared off as shown, in some embodiments.

Figure 8A:
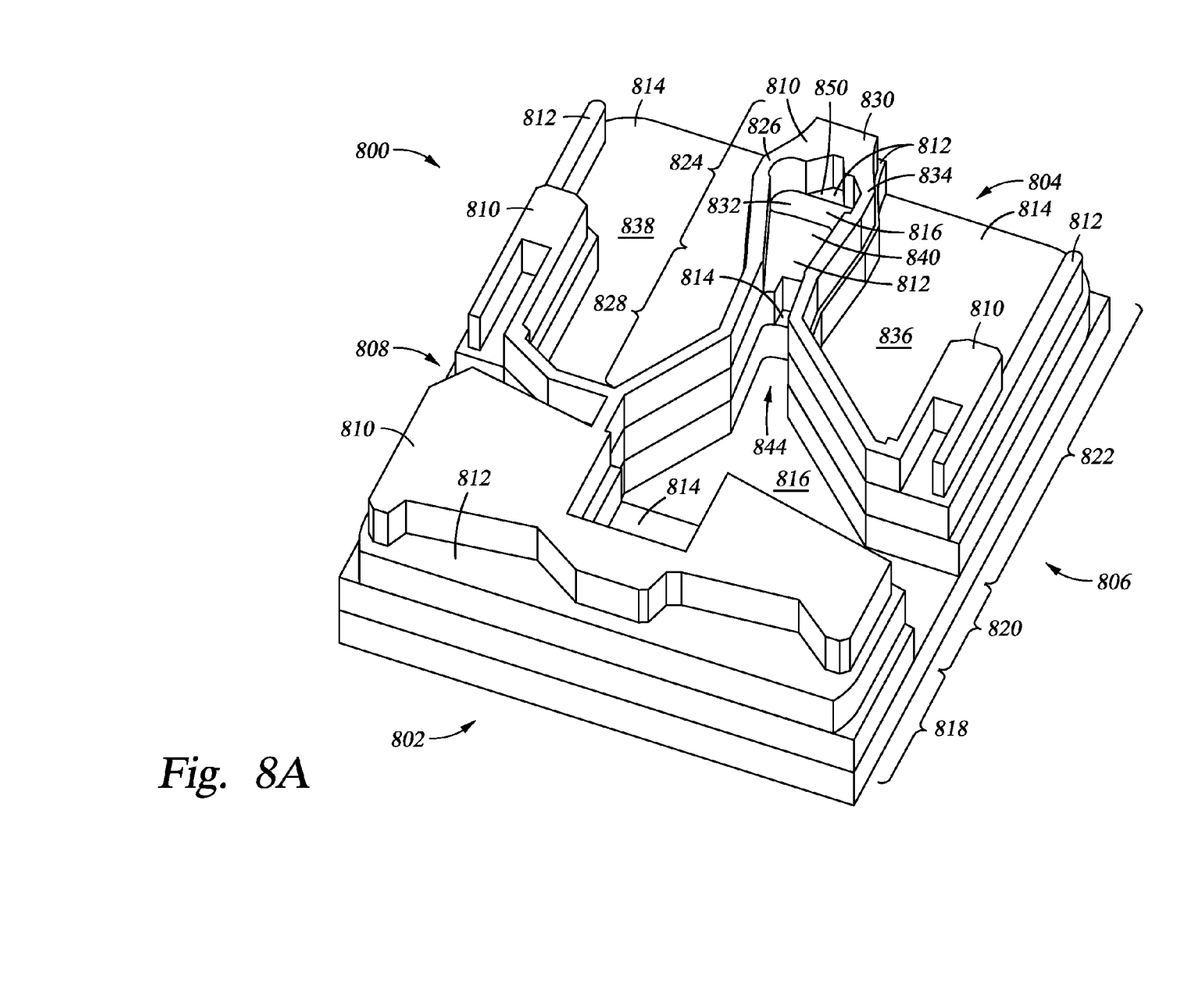
FIG. 8A is an isometric view of head slider according to one embodiment.
Figure 8B:
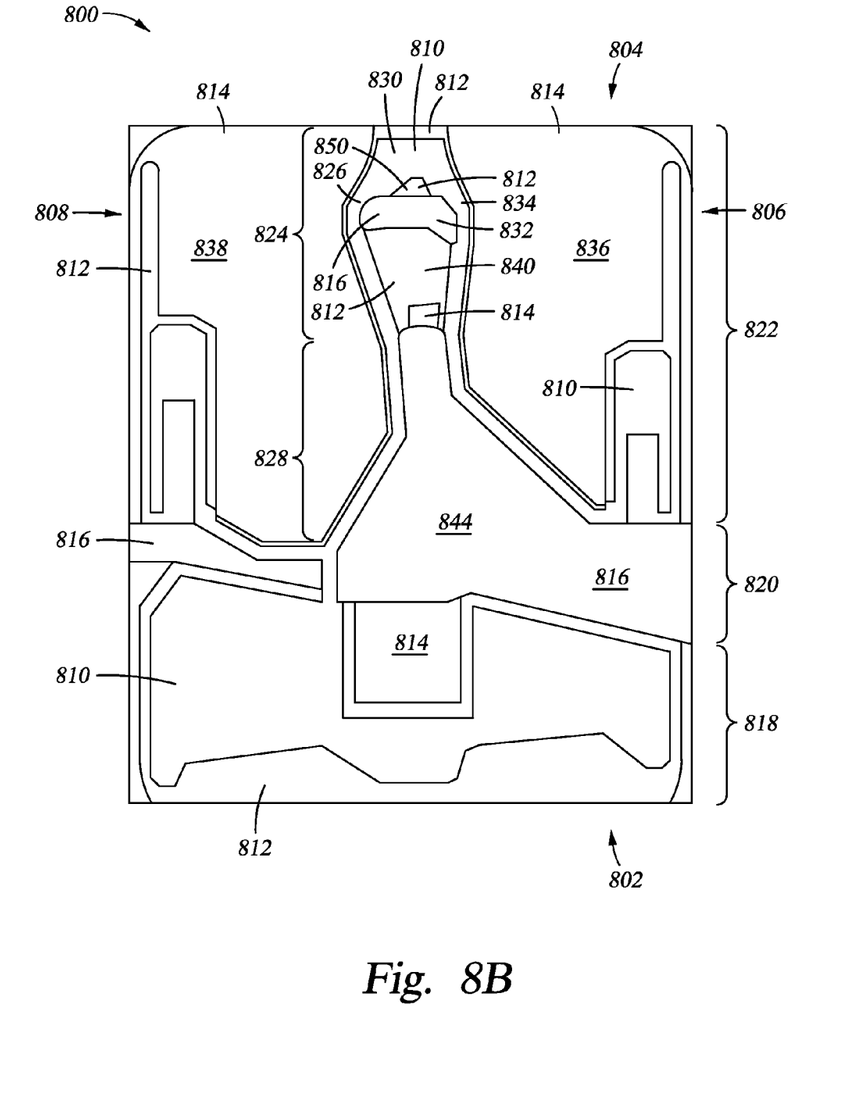
FIG. 8B is a top view of the head slider of FIG. 8A.

FIG. 8A is an isometric view of head slider 800 according to another embodiment. FIG. 8B is a top view of the head slider 800 of FIG. 8A. The head slider 800 has a leading edge 802, a trailing edge 804, an inside edge 806 that will be disposed close to the ID of the hard disk during operation, and an outside edge 808 that will be disposed close to the OD of the hard disk during operation. The head slider 800 has a body having an ABS 810 and three additional surfaces. The first surface 812 is disposed a first vertical distance of between about 5 nm and about 500 nm below the surface of the ABS 810. The second surface 814 is disposed a second vertical distance greater than the first vertical distance and between about 10 nm and about 5.0 µm below the surface of the ABS 810. The third surface 816 is disposed a third vertical distance that is greater than the second vertical distance and between about 10 nm and about 10 µm below the surface of the ABS 810. In one embodiment, the ABS 810 is an MFS.

The head slider 800 includes a leading portion 818 and a trailing portion 822 that is coupled to the leading portion 818 by a flange portion 820 at the ABS 810. The trailing portion 822 has a tail section 824 and a neck section 828. The neck section 828 includes a portion of the third surface 816 and feeds into the cavity 844 that is between the ABS 810 of the leading portion 818 and the trailing portion 822. The tail section 824 also includes a portion of the third surface 816 which is called the write hole 832. The write hole 832 is equivalent to the RIE plateau 412 discussed above. The write hole 832 is disposed adjacent a portion of the first surface 812 that is referred to as a first plateau 840 in the tail section 824 and a notch 850, which is adjacent a first side 830 of the ABS 810 and included in the tail section 824. The write hole 832 is also adjacent a second side 826 of the ABS 810 that extends from a first side 830 of the ABS 810 in a direction generally towards the leading edge 802 and a third side 834 of the ABS 810 that extends from the first side 830 of the ABS 810 in a direction generally towards the leading edge 802. The write hole 832 has a greater area than the notch 850. The notch 850 is disposed at the same vertical height as the first surface 812 and at the same vertical height as the leading edge 802. The notch 850 may vary in both size and shape, and more than one notch 850 may be present, as shown in FIG. 9.

FIG. 8B is an overhead view of FIG. 8A. As shown in FIG. 8B, the write hole 832 has a width in a direction parallel to the leading edge 802 that is greater than the width of the third surface 816 in the neck section 828 in a direction parallel to the leading edge 802. The tail section 824 and the neck section 828 are bound by plateaus 836, 838 of the second surface 814. It is to be understood that while the write hole 832 is shown to have a shape having a width in the direction parallel to the trailing edge 804 that is greater than a length in a direction perpendicular to the trailing edge 804, the shape of the write hole 832 is not limited. Rather, the shape of the write hole 832 may be customized to suit the needs of the application. The notch 850 is shown to have about an equal thickness to the write hole 832, but the notch 850 may be thicker or thinner than the write hole 832, where the thickness is the length in the direction perpendicular to the trailing edge 804. The notch 850 is also shown to have a width in a direction parallel to the leading edge 802 that is greater than the width of the third surface 816 in the neck section 828 in a direction parallel to the leading edge 802, but less than the width of the write hole 832. It is to be understood that while the notch 850 is shown to have a shape having a width in the direction parallel to the trailing edge 804 that is greater than a length in a direction perpendicular to the trailing edge 804, the shape of the notch 850 is not limited, and the shape of the notch 850 may be customized to suit the needs of the application.

Figure 9A:
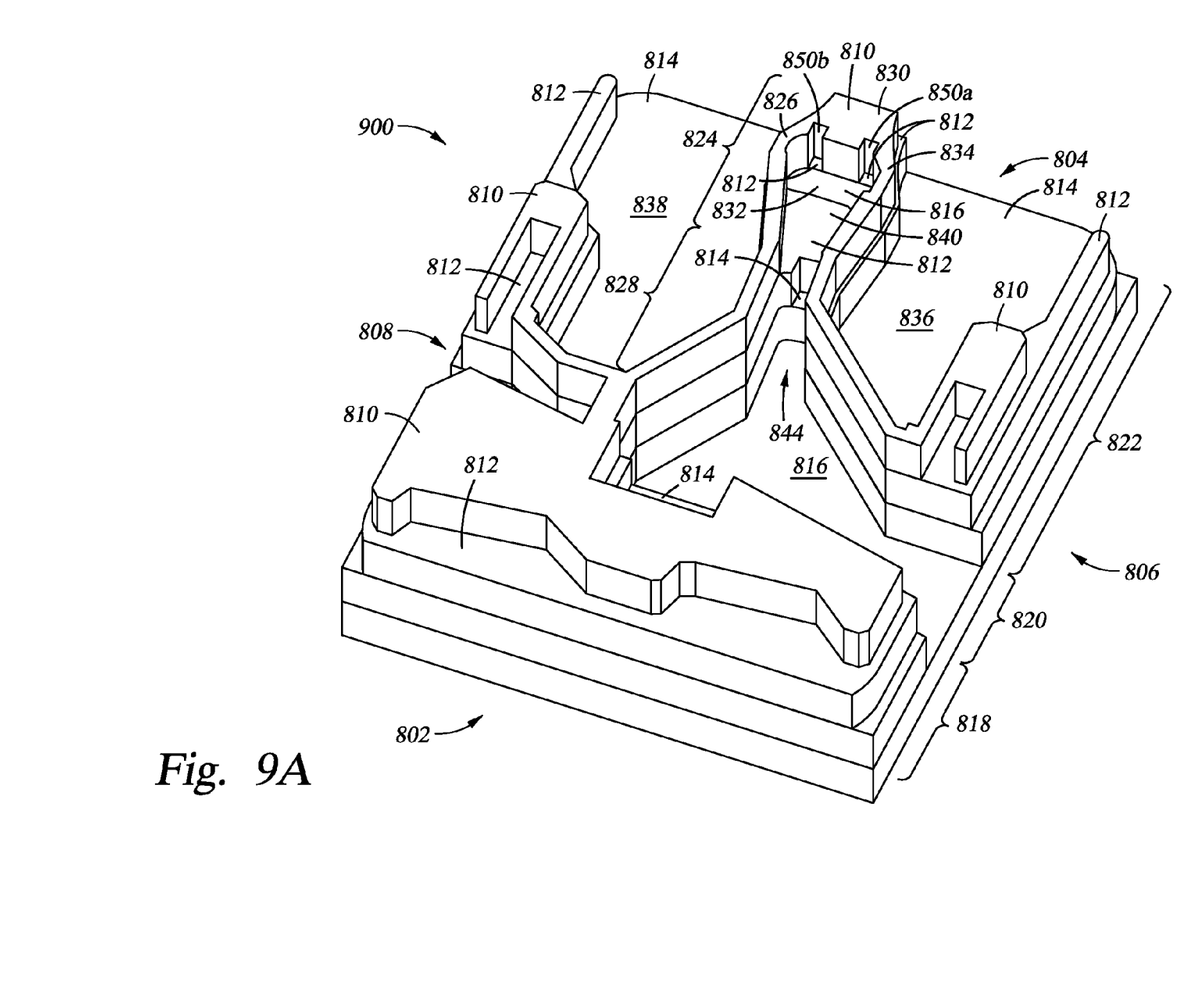
FIG. 9A is an isometric view of head slider according to another embodiment.
Figure 9B:
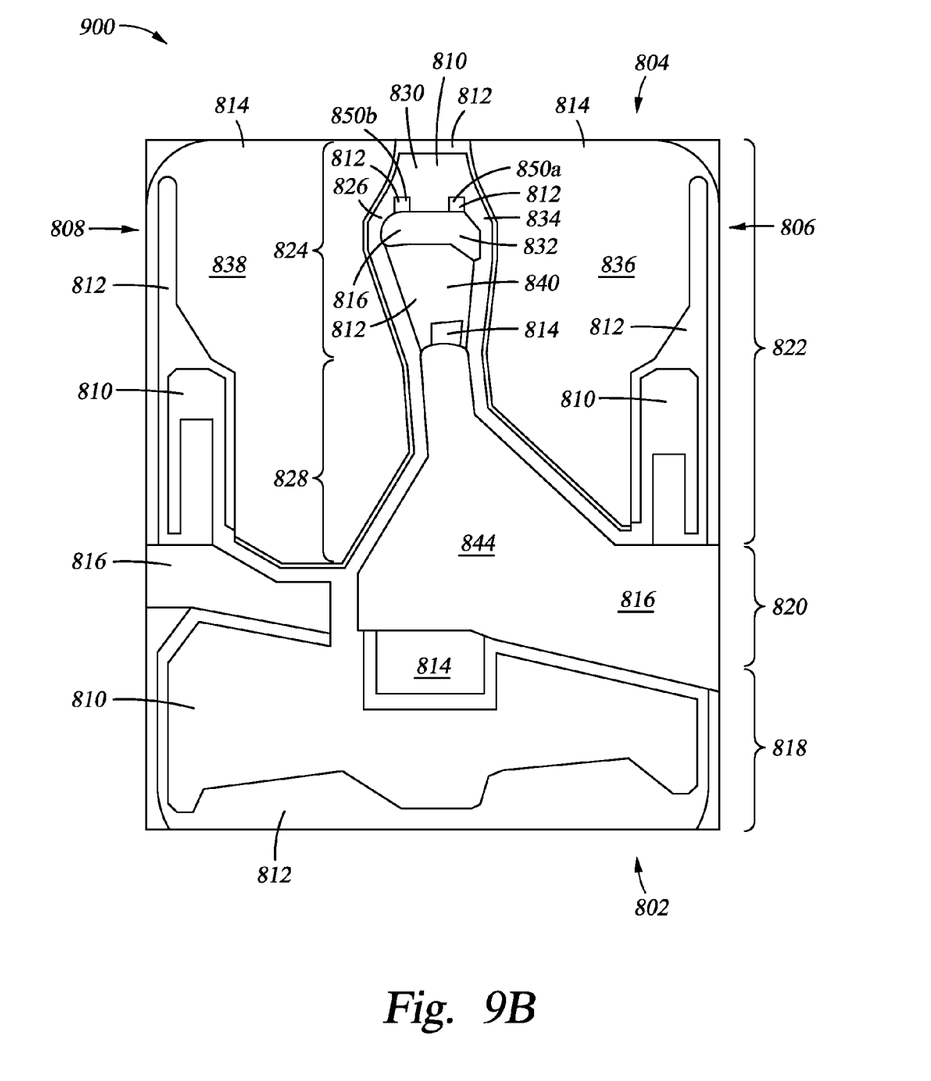
FIG. 9B is a top view of the head slider of FIG. 9A.

FIG. 9A illustrates an alternative embodiment of the head slider 900, according to another embodiment. FIG. 9B is an overhead view of FIG. 9A. FIGS. 9A-9B are similar to FIGS. 8A-8B, with the exception of the number of notches 850. FIGS. 9A-9B show one embodiment of the head slider 800 having two notches 850a, 850b. The notches 850a and 850b are at the first etch depth of the first surface 812. One notch 850a may have a greater area than the other notch 850b, and one notch 850a may have a different shape than the other notch 850b. The notches 850a, 850b are shown to be rather small in comparison to the write hole 832 in both width and length. It is to be understood that while the notches 850a, 850b are shown to have a shape having a width in the direction parallel to the trailing edge 804 that is greater than or equal to a length in a direction perpendicular to the trailing edge 804, the shapes of the notches 850a, 850b are not limited. Rather, the shape of the notch 850 may also be customized to suit the needs of the application. Having two notches 850a, 850b bound by the write hole 832 and the first side 830 of the ABS 810 within the tail section 824 further helps boost local pressure development at the trailing edge 804. Although two notches 850a, 850b are described in the embodiment, it should be noted that the head slider 800 is not limited to having only one or two notches, and any number of notches 850 may be present.

The write hole 832 in combination with the one or more notches 850 may provide numerous benefits in various embodiments. For example, the write hole 832 and the one or more notches 850 in combination may improve the altitude performance of the head slider 800 by minimizing fly height variations at high altitudes (i.e., altitudes above 3000 m) or in low atmospheric pressure environments such as less than 0.7 atm. The write hole 832 and the one or more notches 850 prevent the fly height from changing. Additionally, the write hole 832 and the one or more notches 850 limit the amount of lubricant that will flow over the ABS 810. Ideally, the lubrication will remain within the write hole 832 and not get between the ABS 810 and the hard drive. The write hole 832 and the one or more notches 850 also boost the dampening coefficient in the pitch dimension which will prevent the head slider 800 from pitching and thus, reduce the likelihood of the head slider 800 crashing into the hard drive. The one or more notches 850 also allow for the airflow to flow as desired and create an even lifting power over the entire head slider surface. The one or more notches 850 also allow the head slider 800 to more accurately follow the contours or a magnetic media or disk.

A comparison can be made between the embodiment of a head slider with one notch, the embodiment of a head slider with two notches, and an embodiment of a head slider having zero notches. The comparisons made for the three embodiments were done when the head sliders were at an inner diameter, an outer diameter and a mid disk point on a magnetic media or disk. Both head slider embodiments having at least one notch have better air bearing compliance and low thermal fly height control (TFC) actuation efficiency than the head slider having no notches. The head slider having one notch has a lower TFC actuation efficiency and a higher touchdown power (TDP) than the head slider having two notches. Although the head slider having two notches has a lower TDP than the head notch having one notch, the head slider having no notches has the lowest TDP. However, the difference in TDP between the head slider having two notches and the head slider having no notches is only about 10 mW, and the air bearing compliance is significantly greater in the head slider having two notches. The head slider having one notch also achieves a greater air bearing compliance than the head slider having no notches; however the TDP of the head slider having one notch is greater than the head slider having zero notches by about 37 mW.

Comparing the head slider having two notches to the head slider having zero notches, the head having two notches has an average of about 11% more pressure sensitivity than the head slider having zero notches when the TFC is off. When the TFC is on, the head slider having two notches has an average of about 18% less pressure sensitivity than the head slider having zero notches. Regarding force over bulge (FOB), the head slider heaving two notches has about 12% more force (stiffer) than the head slider having no notches. Further, the air bearing peak pressure at an outer diameter of a disk of the head slider having two notches is about 16% lower than the head having no notches, effectively reducing lubricant pick up.

Further comparing the three different embodiments of head sliders, crown sensitivity is greatly improved in the head sliders having one or more notches. At an outer diameter on a disk, the head slider having two notches has about a 24% improved crown sensitivity than the head slider having no notches. The head sliders having one or more notches also have improved z-height sensitivity. At an outer diameter on the magnetic media, the head slider having two notches has about a 32% improved z-height sensitivity than the head slider having zero notches. The three head slider embodiments are comparable in fly height, pitch, and roll, making the new embodiments with one or more notches an overall improved head slider structure than the head slider having zero notches.

The embodiments discussed above all result in an improved head slider with improved air bearing compliance and higher actuation efficiency. The one or more notches disposed on the head slider allow for the airflow to flow as desired and to create an even lifting power over the entire head slider surface, allowing the head slider to more accurately follow the contours of a magnetic media or disk.

While the foregoing is directed to embodiments of the present invention, other and further embodiments of the invention may be devised without departing from the basic scope thereof, and the scope thereof is determined by the claims that follow.

What is claimed is:

1. A head slider, comprising:
   a head body having a leading edge, a trailing edge and a media facing surface, the media facing surface having:
      a leading portion; and
      a trailing portion coupled to the leading portion by a flange portion, the trailing portion having a tail section disposed adjacent the trailing edge;
   the head body also having a first surface disposed a first vertical distance from the media facing surface, the first surface at least partially surrounded by the tail section;
   the head body also having a second surface disposed a second vertical distance from the media facing surface that is greater than the first vertical distance, the second surface partially defining the boundaries of the tail section;
   the head body also having a third surface disposed a third vertical distance from the media facing surface that is greater than the second vertical distance, wherein the tail section includes a first plateau disposed at the third surface, wherein the first plateau is at least partially surrounded by the media facing surface, wherein the tail section further includes a second plateau disposed at the first surface and disposed closer to the leading portion than the first plateau, wherein the second plateau borders the first plateau, wherein the tail section further includes at least one notch disposed at the first surface, wherein the at least one notch is disposed closer to the trailing edge than the first plateau, and wherein the at least one notch borders the first plateau and the media facing surface.

2. The head slider of claim 1, wherein the at least one notch is disposed at the first surface is two notches.

3. The head slider of claim 2, wherein one notch has a greater area than the other notch.

4. The head slider of claim 2, wherein the two notches have different shapes.

5. The head slider of claim 1, wherein the first vertical distance is between about 5 nm to about 500 nm.

6. The head slider of claim 1, wherein the second vertical distance is between about 10 nm to about 5 μm.

7. The head slider of claim 1, wherein the third vertical distance is between about 10 nm to about 10 μm.

8. A magnetic recording system, comprising:
an actuator;
an actuator arm coupled to the actuator;
a slider coupled to the actuator arm; and
a head slider coupled to the slider, comprising:
- a head body having a leading edge, a trailing edge and a media facing surface, the media facing surface having:
  - a leading portion; and
  - a trailing portion coupled to the leading portion by a flange portion, the trailing portion having a tail section disposed adjacent the trailing edge;
- the head body also having a first surface disposed a first vertical distance from the media facing surface, the first surface at least partially surrounded by the tail section;
- the head body also having a second surface disposed a second vertical distance from the media facing surface that is greater than the first vertical distance, the second surface partially defining the boundaries of the tail section;
- the head body also having a third surface disposed a third vertical distance from the media facing surface that is greater than the second vertical distance, wherein the tail section includes a first plateau disposed at the third surface, wherein the first plateau is at least partially surrounded by the media facing surface, wherein the tail section further includes a second plateau disposed at the first surface and disposed closer to the leading portion than the first plateau, wherein the second plateau borders the first plateau, wherein the tail section further includes at least one notch disposed at the first surface, wherein the at least one notch is disposed closer to the trailing edge than the first plateau, and wherein the at least one notch borders the first plateau and the media facing surface.

9. The magnetic recording system of claim 8, wherein the at least one notch is disposed at the first surface is two notches.

10. The magnetic recording system of claim 9, wherein one notch has a greater area than the other notch.

11. The magnetic recording system of claim 8, wherein the leading portion includes a leading edge, the leading edge disposed at the same vertical distance from the media facing surface as the one or more notches.

12. The magnetic recording system of claim 8, wherein the first vertical distance is between about 5 nm to about 500 nm.

13. The magnetic recording system of claim 8, wherein the second vertical distance is between about 10 nm to about 5 µm.

14. The magnetic recording system of claim 8, wherein the third vertical distance is between about 10 nm to about 10 µm.

15. A hard disk drive, comprising:
a spindle;
one or more magnetic media disposed on the spindle;
a read/write head;
an actuator;
an actuator arm coupled to the actuator;
a slider coupled to the actuator arm; and
a head slider coupled to the slider, comprising:
- a head body having a leading edge, a trailing edge and a media facing surface, the media facing surface having:
  - a leading portion; and
  - a trailing portion coupled to the leading portion by a flange portion, the trailing portion having a tail section disposed adjacent the trailing edge;
- the head body also having a first surface disposed a first vertical distance from the media facing surface, the first surface at least partially surrounded by the tail section;
- the head body also having a second surface disposed a second vertical distance from the media facing surface that is greater than the first vertical distance, the second surface partially defining the boundaries of the tail section;
- the head body also having a third surface disposed a third vertical distance from the media facing surface that is greater than the second vertical distance, wherein the tail section includes a first plateau disposed at the third surface, wherein the first plateau is at least partially surrounded by the media facing surface, wherein the tail section further includes a second plateau disposed at the first surface and disposed closer to the leading portion than the first plateau, wherein the second plateau borders the first plateau, wherein the tail section further includes at least one notch disposed at the first surface, wherein the at least one notch is disposed closer to the trailing edge than the first plateau, and wherein the at least one notch borders the first plateau and the media facing surface.

16. The hard disk drive of claim 15, wherein the at least one notch is disposed at the first surface is two notches.

17. The hard disk drive of claim 16, wherein the two notches have different shapes.

18. The hard disk drive of claim 15, wherein the leading portion includes a leading edge, the leading edge disposed at the same vertical distance from the media facing surface as the at least one notch.

19. The hard disk drive of claim 15, wherein the first vertical distance is between about 5 nm to about 500 nm.

20. The hard disk drive of claim 15, wherein the second vertical distance is between about 10 nm to about 5 µm and the third vertical distance is between about 10 nm to about 10 µm.

* * * * *